United States Patent [19]

Castaneda

[11] Patent Number: 4,718,558

[45] Date of Patent: Jan. 12, 1988

[54] PROCESS AND APPARATUS FOR SORTING SAMPLES OF MATERIAL

[75] Inventor: Fernando Castaneda, San Jose, Costa Rica

[73] Assignee: Xeltron, S.A., San Jose, Costa Rica

[21] Appl. No.: 787,534

[22] Filed: Oct. 15, 1985

[30] Foreign Application Priority Data

Oct. 17, 1984 [EP] European Pat. Off. ........ 84/122,504

[51] Int. Cl.[4] ........................ B07C 5/342; G05B 23/02

[52] U.S. Cl. .................................... 209/546; 209/581; 209/587; 364/571; 364/579

[58] Field of Search ............... 209/546, 548, 549, 551, 209/563-566, 576, 577, 580, 581, 587; 250/252.1; 364/571, 579

[56] References Cited

U.S. PATENT DOCUMENTS

| | | | |
|---|---|---|---|
| 3,899,415 | 8/1975 | Codding et al. | 209/581 |
| 4,057,146 | 11/1977 | Castaneda et al. | 209/581 |
| 4,097,860 | 6/1978 | Araseki et al. | 364/571 X |
| 4,134,498 | 1/1979 | Jones et al. | 209/582 X |
| 4,239,118 | 12/1980 | Lockett | 209/581 |
| 4,262,806 | 4/1981 | Drabs | 209/577 |
| 4,296,320 | 10/1981 | Miller | 250/252.1 |
| 4,323,159 | 4/1982 | Wolf | 209/548 |
| 4,350,442 | 9/1982 | Arild et al. | 209/582 X |
| 4,454,029 | 6/1984 | Codding | 209/581 |
| 4,494,212 | 1/1985 | Muellner | 364/571 |
| 4,626,677 | 12/1986 | Browne | 209/580 X |

FOREIGN PATENT DOCUMENTS

| | | | |
|---|---|---|---|
| 0010940 | 5/1980 | European Pat. Off. | 209/580 |
| 2057123 | 3/1981 | United Kingdom | 209/587 |
| 1024126 | 6/1983 | U.S.S.R. | 209/577 |

*Primary Examiner*—Robert B. Reeves
*Assistant Examiner*—Edward M. Wacyra
*Attorney, Agent, or Firm*—Seed and Berry

[57] ABSTRACT

An optical sorter for beans and grains, including a detector providing a signal pulse for each of the sampled objects, and a signal processor for receiving and amplifying the pulse. The signal processor measures the amplitude of the amplifier pulse and compares the amplitude value to a predetermined standard value. The pulses are counted up to a predetermined count, and the number of pulses having an amplitude value above the predetermined standard value out of the total number of counted pulses, is counted. The counted number of pulses having an amplitude above the standard value is compared to a preselected number, and the gain of the signal processor is adjusted with a negative feedback signal to adjust toward the preselected number, the counted number of pulses in the next count having an amplitude value at the predetermined standard value. The sorter uses the peak amplitude value of the pulse which is determined by taking a derivative of the signal and determining the zero crossing time of the derivative signal.

23 Claims, 14 Drawing Figures

PROCESS AND APPARATUS FOR SORTING SAMPLES OF MATERIAL

DESCRIPTION

1. Technical Field

The present invention relates generally to optical sorting machines for sorting individual objects such as beans, grains, fruit and the like.

2. Background of the Invention

In the sorting of objects such as beans, grains, fruits and the like based upon color and/or size, the objects usually pass a detector which generates an electronic signal derived from the object being sampled. The signal may be in the form of visible light, ultraviolet light, infrared light, or other electromagnetic radiation such as x-rays, microwaves or the like. Ultrasonic signals could also be used. An example of one such sorting machine is described in U.S. Pat. No. 4,057,146.

In the apparatus of the aforementioned patent, sorting of beans or grains may be accomplished by allowing the objects to fall one at a time through a ring of detectors in which two colors of light are reflected off the sampled object. The signals of several detectors are combined in a photocell for each color of light. The signals of the photocells are then electronically processed with the pulses corresponding to an object indicating properties of the object.

If one of the objects being sampled does not have the desired properties, as indicated by the signals, for example, if it is too small or has an unwanted color, the object is rejected. To reject the object, after a given delay so that the falling object can reach the sorting device, the sorting device is activated. The sorting device can be a stream of air produced by activating a solenoid.

In the past, the delay was a fixed time period calculated to allow the falling object sufficient time to pass by the detectors and reach the sorting device. Since this flight time depends upon the velocity with which the particular object is traveling, it can vary from one sample to the next depending upon the size and shape of the object, whether it has just touched a wall of the apparatus and other factors. If the type of bean or grain being sorted is changed, there could be significant changes in flight times between the different types of objects. The differences in flight time can produce inaccurate sorting results.

Another serious problem with such a sorting machine is the fact that the gain of the devices for electronically processing the signals from the photocells has to be regularly adjusted. Adjustment is required to compensate for changed in the amplitudes of the signals result-, ing from changed operating conditions, including constantly changing amounts of dust deposits on the light source or the detectors used. While the blowing of compressed air on the light-collecting ends of the detectors helps prevent the accumulation of dust and other debris, degradation of signal amplitude still can result since the air pressure is not always enough to remove dust which is electrostatically held to the detector end surfaces. In normal operation, the gain of the devices has to be frequently adjusted by hand which requires that an operator be highly trained and be constantly watching the sorting machine.

Adjustment of the gain is also required if the type of bean or grain being sorted is changed since the new bean or grain may have a different color than the one for which the machine is originally set up. Gain must also be rechecked, if not reset, each time the machine is started to assure that it is operating at the proper settings. In addition to requiring the constant attention of a trained operator, manual adjustment of the gain increases the likelihood that an adjustment error will be made which results in bad sorting results.

Automatic gain control (AGC) is well known in radio and television receivers. Such automatic gain control, however, is operative only in connection with a more or less continuous signal, e.g., more or less continuous steady oscillations. The amplified signals in such AGC devices are averaged by integrating (if necessary after rectification). The corresponding DC signal is used for adjusting the gain.

Such a conventional automatic gain control system cannot be used with the intermittent signals typical of sorting machines. The total average signal of such a sorting machine will be not only a function of the individual pulses resulting from the objects being sorted, but also will be a function of the total number of pulses being processed within a given time. The number of pulses within a given time depends on the particular bean or grain flow rate at which the machine may be operating during any one time period. If a conventional automatic gain control system would be used, the gain would be reduced if the number of objects being sorted increased for a given period of time corresponding to an increase flow rate of the objects being sorted. This effect, of course, is not desired.

It will therefor be appreciated that there has been a significant need for a sorting apparatus which requires no manual adjustment of the gain and can be operated by a person without technical education and with little supervision. The present invention fulfills this need and further provides other related advantages.

3. Disclosure of the Invention

A method and apparatus for sorting individual samples of material. The method is used with a signal processor which activates a sorting device. The method includes producing a signal pulse for each sample and amplifying the pulse according to the gain to which the signal processor has been previously adjusted, measuring an amplitude value of each of the pulses, counting the total number of pulses up to a predertermined count, counting pulses within the count having an amplitude value exceeding the predetermined value, and readjusting the gain of the signal processor if the number of pulses having an amplitude value exceeding the predetermined value deviates from the preselected number. The gain is increased if the number of pulses having an amplitude value exceeding the predetermined value is below the preselected number, and the gain is decreased if the number of pulses is above the preselected number. The peak amplitude value is used as the measured amplitude value of the pulses.

The peak amplitude value is determined by sampling the pulse amplitude value, storing the sampled amplitude value as the maximum value, then time-wise successively sampling the amplitude value and comparing the sample amplitude value to the stored maximum amplitude value. If the sample amplitude value exceeds the stored maximum amplitude value, the sample amplitude value is stored as the maximum amplitude value for the pulse. A final stored maximum amplitude value is the peak amplitude value of the pulse. Alternatively, the peak amplitude value is determined by taking the derivative of the pulse to provide a derivative signal, and measuring the amplitude value of the pulse at about the time the derivative signal has a zero crossing value. With this method, the derivative signal may be converted into a square wave function and the amplitude value of the pulse measured at about the time the square wave has a zero crossing value.

The method also includes restoring the DC level of the pulse before measuring the amplitude value. Only the pulses having an amplitude value above a preselected threshold limit are counted. The threshold limit is selected such that spots or imperfections of the samples will not produce pulses which are measured and counted as if another sample. In one embodiment of the invention, two time-wise spaced-apart pulses are produced for each sample. The spacing indicates the traveling speed of the sample and is used to control the timing for actuation of the sorting device based on the traveling speed of the sample.

The sorter includes detecting means for providing a signal pulse for each sample, with the amplitude of the pulse indicating a property of the sample; signal processor means for receiving and amplifying the pulse, with the signal processing means including an adjustment means for selectively increasing and decreasing the amplitude of the pulse; measurement means for measuring the amplitude of the amplified pulse and indicating the amplitude value of the amplified pulse; and comparator means for comparing the amplitude value of the amplified pulse to a predetermined standard value. The sorter further includes means for counting the total number of pulses up to a predetermined count, means for counting the number of pulses having an amplitude above the predetermined standard value out of the total number of counted pulses, and means for comparing the counted number of pulses having an amplitude value above the predetermined standard value to a preselected number. If the counted number is above or below the preselected number, a negative feedback signal is provided to the signal processor for increasing or decreasing, respectively, the amplitude of the pulse to adjust toward the preselected number, the counted number of pulses in the next count having an amplitude value at the preselected standard value.

The sorter further includes means for comparing the pulses to a preselected threshold limit. The two counting means count only pulses above the threshold limit. The threshold limit is selected with respect to the signal level to be created by spots and imperfections of the samples.

The amplitude value of the amplified pulse compared to the predetermined standard value is the peak amplitude value of the pulse. The peak amplitude value may be obtained by sample-and-hold circuitry or by determining the derivative of the pulse and measuring the time in which the derivative signal has a zero crossing value corresponding to the peak value of the pulse.

Alternatively, a method and apparatus may be used which takes the average of the amplitude value of all pulses within the predetermined count, and comparing the average to a preselected value. If the average deviates from the preselected value the gain of the signal processor is readjusted.

Other features and advantages of the invention will become apparent from the following detailed description, taken in conjunction with the accompanying drawings.

BEST MODE FOR CARRYING OUT THE INVENTION

Figure 1:
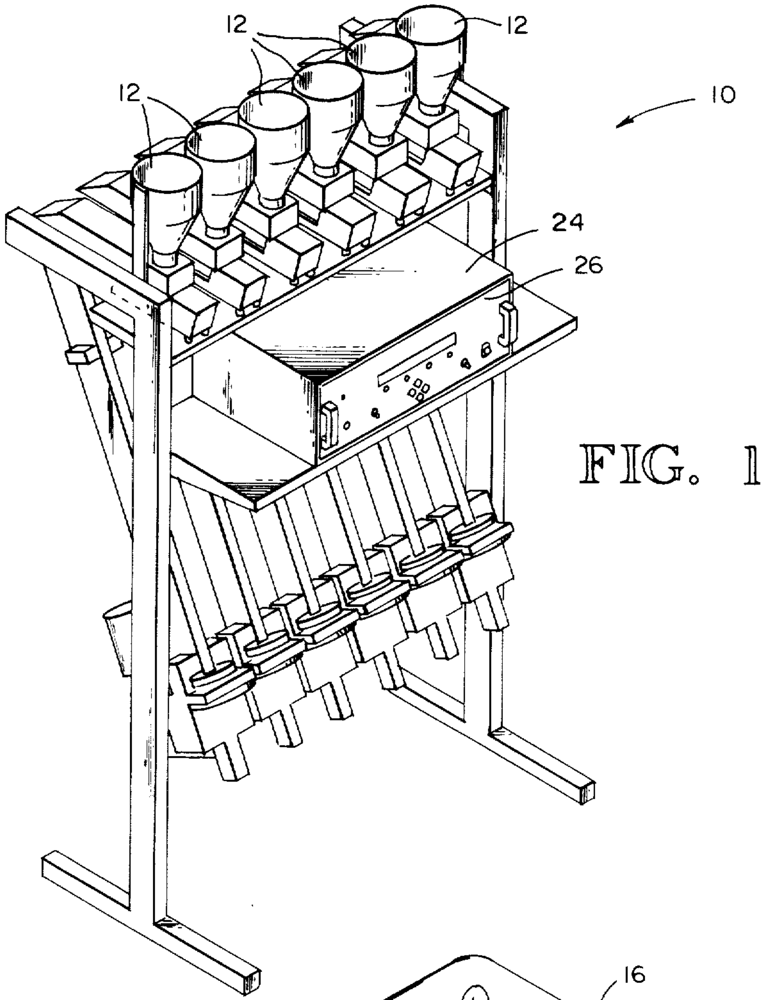
FIG. 1 is an isometric view of a sorting apparatus embodying the present invention.
Figure 2:
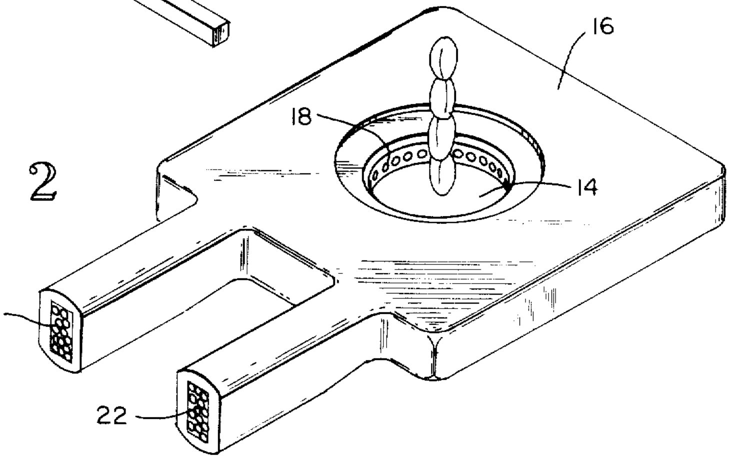
FIG. 2 is an analysis head used with the present invention.

As shown in the drawings for purposes of illustration, the present invention is embodied in an optical sorting apparatus 10 for sorting objects such as coffee beans, grains or the like. The apparatus 10 is illustrated in FIG. 1 as having six channels, each having a hopper 12 in which the objects to be sorted are loaded. The objects pass from the hopper 12 in a controlled fashion to provide a continuous flow and a uniform distribution of objects. The objects are released separately and fall under the influence of gravity one-by-one through a central opening 14 in the center of an analysis head 16, as shown in FIG. 2. White light illumination is provided to the objects as they pass through the opening 14 by a plurality of lamps (not shown). The apparatus is similar to that described in U.S. Pat. No. 4,057,146, which description is incorporated herein by reference.

Figure 9:
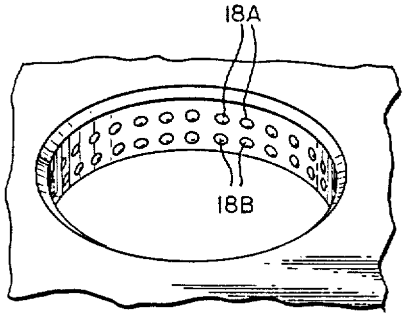
FIG. 9 shows a two-row arrangement of optical fibers as an alternative to the single row used in the analysis head of FIG. 2.

The reflected light off of the objects is conveyed by a plurality of optical fibers 18 arranged with one of their ends spaced-apart in a row about the opening 14 of the head 16. Alternatively, a double row of optical fibers may be used, one above the other, as shown in FIG. 9. The description of the detailed circuitry which follows will utilize a single row arrangement.

The light reflected from the surface of the object being sorted is conducted to a pair of photocells or other type photodetectors (not shown). Various colors may be selected to optimize the operation of the apparatus with the particular object being sorted. By placing the ends of the optical fibers 18 which receive the reflected light completely around the object being sorted, the object is viewed from all sides simultaneously. The optical fibers 18 are divided into two bundles, with every other fiber around the central opening 14 being from one bundle 20 and the other fibers being from another bundle 22. Each of the bundles 20 and 22 conducts the reflected light to one of the two photodetectors. The reflective light in each of the bundles 20 and 22 can be conveyed through one of two different color filters, to produce two monochromatic light beams of different wave lengths. The photodetectors convert the two light beams to two electrical signals. Alternatively, the reflective light in each of the bundles can be conveyed to its corresponding photodetector without filtering if photodetectors with differing electronic response characteristics are used.

A deflecting means (not shown) is positioned below the analysis head 16 and selectively deflects the falling objects after they have passed through the opening 14 in response to a signal from a signal processor of the apparatus 10 indicating that the object is to be rejected based upon analysis of the signal produced by the light reflected from the object. The beans or grains whose color or size deviates beyond the preset tolerance limits are automatically deflected. The signal processor will be described in more detail below.

The deflecting means may be a valve which is opened to supply a pulse of compressed air from an air jet (not shown) to deflect the object to be rejected toward a rejection hopper. If the object is not to be rejected, but is to be accepted, the valve is not actuated and the object falls directly into an acceptance hopper (not shown).

The signal analyzer for the apparatus 10 is housed in a control unit 24 having a control panel 26 which displays information and allows the operator to control the apparatus, including the setting of parameters.

Although each of the bundles 20 and 22 receives essentially the same illumination, the two photodetectors which receive the reflected light from the bundles will, as a result of their different characteristics or as a result of the use of filters, produce different electrical responses or signals. The signals will each comprise series of pulses time-wise spaced corresponding to the spacing between the stream of objects passing through the opening 14 in the head 16, with each pulse being the result of the light reflected therefrom. Since the reflected light energizing both photodetectors are the same, the electrical response from each of the photodetectors is synchronized with the other. As such, the pulse for a particular object being sorted from either signal may be used for timing purposes, such as to determine the time occurrence of the peak pulse value for both signals. Since only light reflected from the object being sorted is received by the optical fibers 18 and transmitted to the photodetectors, and since there is no background radiation, processing of the electrical signals produced is simplified.

In accordance with the present invention, the peak values of the pulses comprising only one of the signals provided by the bundles 20 and 22 are measured. Only the pulses with a peak amplitude value above a predetermined spot threshold level are counted. This is to eliminate false peaks produced by spots or imperfections on the surface of the object being sorted and provide that only a single peak is read for a single object. The total number of pulses above the spot threshold level are counted up to a predetermined count. In the presently preferred embodiment of the invention, the predetermined sample count is set at 256.

The pulses out of the sample count with a peak value exceeding a predetermined standard level are counted, and the count is compared to a preselected number. In the presently preferred embodiment, the preselected number is 128. If the counted pulses with a peak value exceeding the standard level deviates from the preselected number, the gain of the signal processor is automatically adjusted and the counting cycle starts again. If the count exceeds the preselected number, negative feedback is provided to reduce the gain and produce fewer pulses having a peak value exceeding the standard level during the next sample count. If the count is less than the preselected number, the gain is increased to produce more pulses having a peak value exceeding the standard level during the next sample count. In the presently preferred embodiment of the invention, a microprocessor is utilized to compare the peak amplitude values of the pulses to a stored value for the standard level, to make the sample count and the count of pulses having a peak value exceeding the standard level, and to provide a feedback signal to the signal processor to adjust the gain.

Alternatively, the peak amplitude values for all of the pulses in the sample count are stored and an average taken to determine an average peak value. This average peak value is compared to the standard level, and if the average peak value exceeds the standard level, the gain is adjusted accordingly.

Either approach causes automatic adjustment of the gain of the signal processor, so that adequately amplified signals are achieved to compensate for dust or debris accumulation which reduces the signal strength, to eliminate the need to re-calibrate if there is a change of objects being sorted, and to self-adjust the apparatus on start-up if it is closed down for cleaning or any other purpose.

The microprocessor may accomplish the adjustment of gain by any suitable convenient reiterative algorithm, or if the alternative approach is used, by changing the gain in proportion to the overage and underage of the average peak value compared to the standard level selected. A convenient reiterative algorithm which is easy to implement in the microprocessor, is to provide a negative feedback signal to decrease the gain by dividing a stored gain value by a factor of two, such as by merely shifting the binary number corresponding to the gain value to the right by one position. If the gain is to be increased, the binary number may be increased by a factor of 1.5. With such an algorithm the gain is adjusted upward or downward after each counting cycle to cause the peak amplitude values of the pulses in the sample counts to home in on the desired standard level. With the presently preferred embodiment of the invention, a 5-volt standard level is chosen and the signal processor takes approximately five and ten adjustments to reach steady state upon start-up or a significant change in the type of objects being sorted.

The operation of the apparatus 10 is premised on the assumption that for a normal quality of beans or grains to be sorted, the number of acceptable objects in a sample count will at least exceed the preselected number against which the counted number of pulses with a peak value exceeding the level is compared. In a manner, this normalizes the peak value for the pulses of an acceptable object at the selected five-volt standard level. Any objects within the sample count will be rejected if they have a pulse peak amplitude value below a predetermined lower threshold level. It is noted that this level must be set above the spot threshold level. The microprocessor compares the measured peak amplitude value for a pulse to the lower threshold level, and if below, causes the sorting device to deflect and thereby reject the object.

It is noted that the gain will be constantly adjusted as dust accumulates on the lamps or ends of the optical fibers 18 and diminish the signal level. If the apparatus 10 is started up after a closedown for cleaning or otherwise, the gain will automatically be adjusted to an appropriate value. Furthermore, if the type of object being counted is changed, and as a result of its different color or size of objects being sorted the level of signals change, the apparatus will automatically adjust the gain to operate with the new color size objects. No manual re-calibration is required. For example, if the color of the new objects being sorted initially produce a reduced signal level compared to the type of object previously being sorted, the signal processor will quickly increase the gain so that the peak value of the pulses in sample count is brought up to the desired 5-volt standard level. While initially this might result in a small number of acceptable objects to be rejected as if unacceptable, the loss of a few beans or grains is tolerable to eliminate the need for any manual adjustment of the gain. It is also noted that the operation of the signal processor is independent of the flow rate of the objects being sorted, and whether the flow rate is constant or erratic. The gain adjustment is based upon a predetermined sample count, and does not depend on the objects in the sample count being sorted within any fixed time period. Furthermore, it is not dependent on the objects being sorted producing a known pulse amplitude, and the amplitude can vary continuously or be suddenly varied such as by a change in the type of object being sorted.

It is to be to be understood that while the presently preferred embodiment of the invention, as described herein, uses the peak amplitude value of the pulses in the signal for comparison to the standard value, the invention could be practiced utilizing another point on the pulse other than its peak for the purpose of automatically readjusting the gain of the signal processor. Furthermore, several alternative means may be employed for determining the peak value of the pulses. As will be described in more detail below, the presently preferred embodiment of the invention determines the peak value based upon the derivative of the signal passing through the zero point. As is well know, the derivative of a signal is zero at the position of its peak amplitude value. In order to determine the position of the zero derivative which corresponds to the peak value more accurately, the derivative of the pulse signal is amplified into a square wave and the transition from the positive to negative values of the square wave is determined. This corresponds to a zero derivative of a positive peak since it is preceded by a positive value and followed by a negative value, thus eliminating other zero derivatives which might occur.

A sample-and-hold technique could also be conveniently used in which the signal processor successively samples the pulse amplitude and saves the value if it is greater than the previously measured value. The maximum value saved for the pulse is the peak amplitude value. For this, only the presently sampled amplitude value has to be compared with one previously sampled one. If the previous one is smaller, the peak of the pulse has not been reached. When a successive value is equal to or less than the previous one, the approximate peak of the pulse has been reached and the previously stored value is assumed to be the peak amplitude value.

Figure 3:
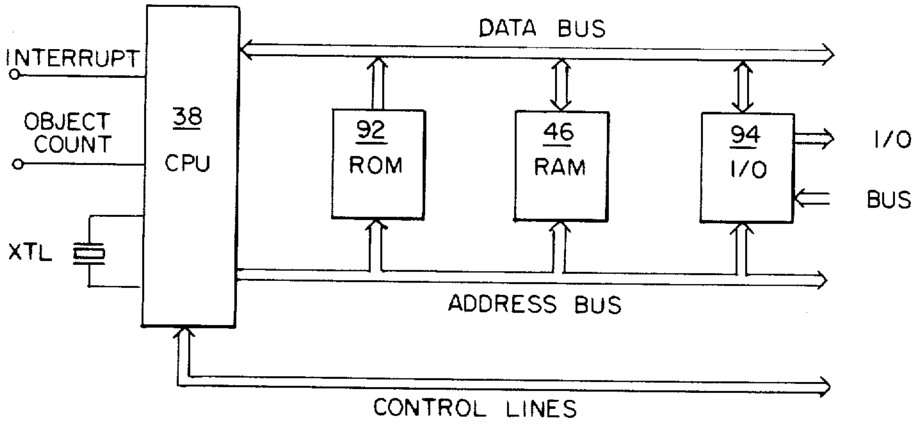
FIG. 3 is a block diagram of the microprocessor used in the present invention.
Figure 4A:
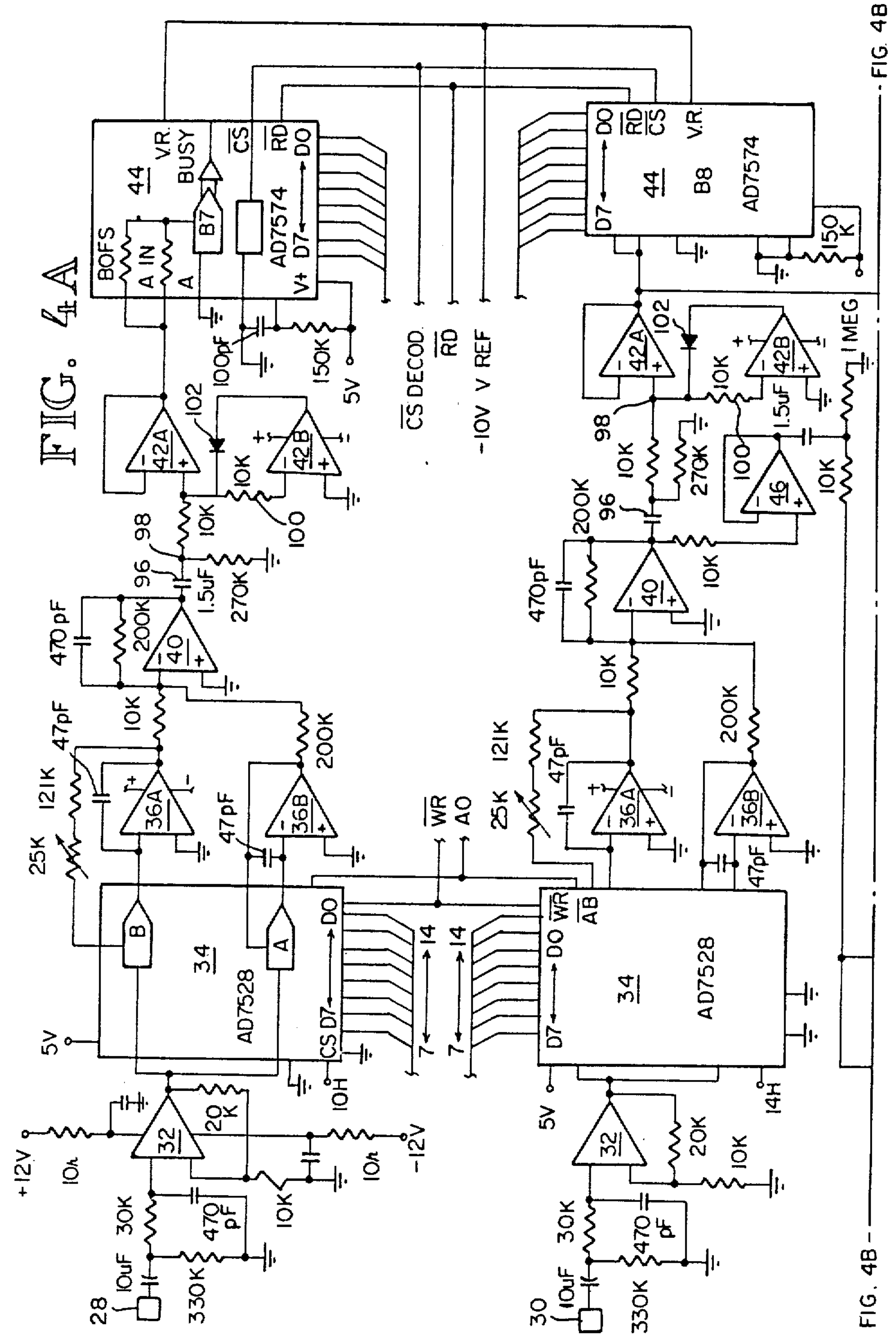
FIG. 4A is a detailed schematic diagram of the circuitry for the apparatus used with the microprocessor of FIG. 3.
Figure 4B:
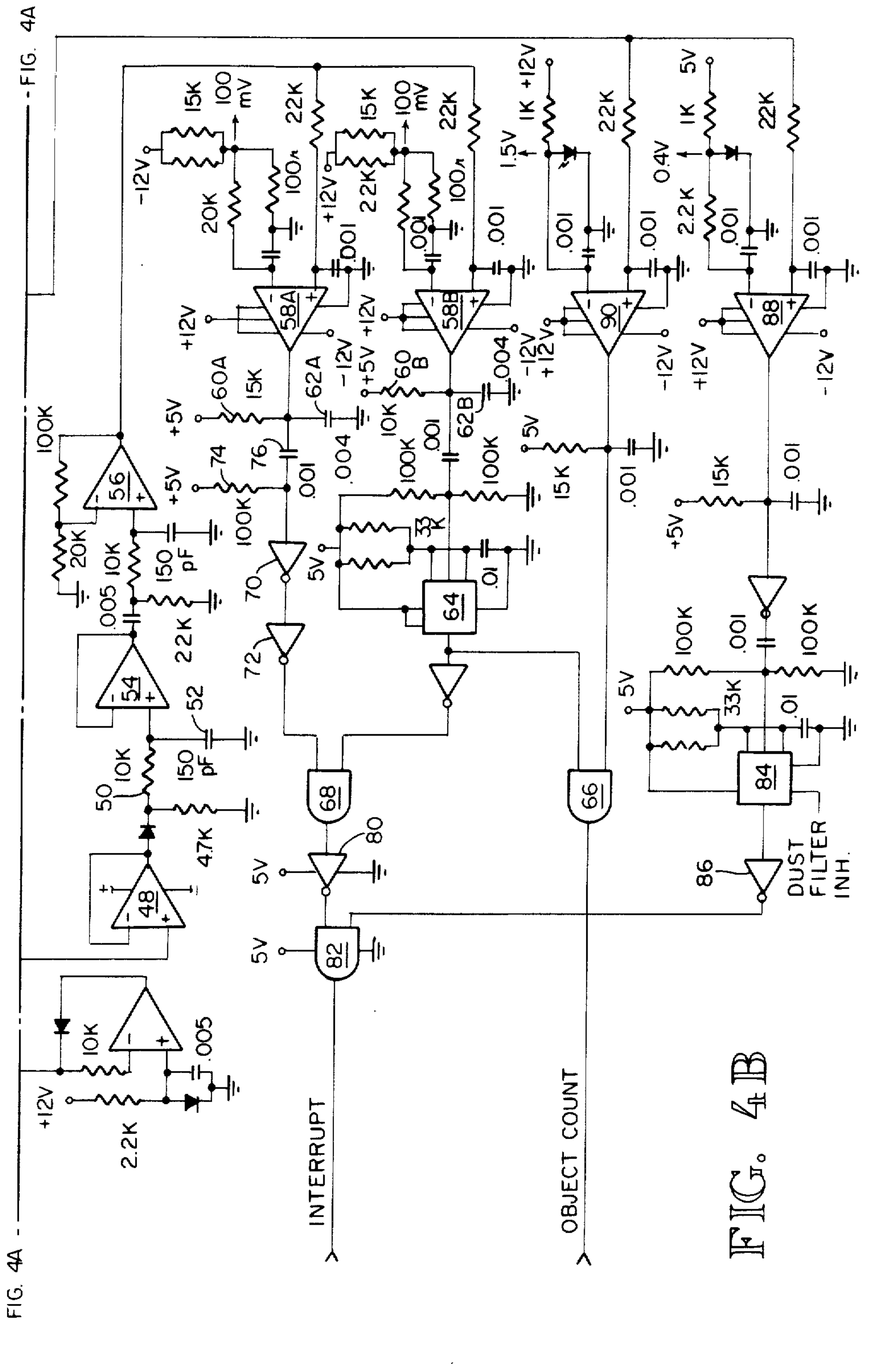
FIG. 4B is the remaining portion of the circuitry of FIG. 4A.

The two photodetectors and the associated preamplification circuit for each is indicated in the schematic diagram of FIG. 4A by the reference numerals 28 and 30. The signal processor for the apparatus 10 comprises the remainder of the circuitry shown in FIGS. 3, 4A and 4B. In the present preferred embodiments of the invention, the electrical signals provided by the photodetectors 28 and 30 are initially processed in much the same manner by the circuitry shown in FIG. 4A. As such, like components will be identically numbered and the description of operation will not be repeated.

Figure 5A:
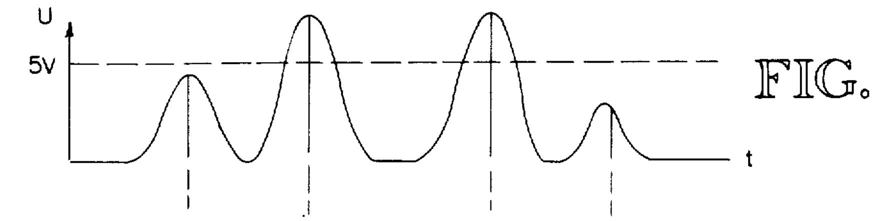
FIG. 5A shows a typical signal of pulses occuring with the present invention.

For the initial processing of the signals produced by the photodetectors 28 and 30, and the circuitry for processing the signal from the photodetector 30 will be described. The signal is supplied to an operational amplifier 32 which amplifies the signal by approximately three times. A typical wave form for this signal is shown in FIG. 5A and comprises a stream of pulses with each pulse corresponding to one object passing through the opening 14 of the analysis head 16. The output of the amplifier 32 is provided to the input of a digital to analog converter multiplier 34. The output of the multiplier 34 is supplied to amplifiers 36A and 36B.

The combined multiplier 34 and amplifiers 36A and 36B amplify the signal within the range from 1 to 256 times, or attenuates the signal by a factor of from 1 to 1/256. The amplification (attenuation) factor is determined by a programming data signal received on the parallel input pins 7 through 14 of the multiplier from a CPU 38 (see FIG. 3) and depends upon the total resistance of the resistance ladder of the multiplier 34. The CPU provides this feedback signal for automatically adjusting the gain of the signal processor.

The output of the amplifiers 36A and 36B is provided to an operational amplifier 40 which makes another amplification of approximately twenty times. The output of the amplifier 40 is provided to a pair of operational amplifiers 42A and 42B, which as will be described below, restore the DC level of the signal before its analog value is read so as to provide an accurate amplitude measurement. A DC zero level has to be restored as a result of the signal being fed to the signal processing circuit through at least one input capacitor. In order to remove the ambiguities of an uncertain DC level, it is desirable to restore the DC level of the signal to the value it had before having been passed through the input capacitor.

The output of the operational amplifier 42A is provided to an 8-bit analog-to-digital convertor 44. The analog-to-digital convertor 44 converts the value of the analog signal into a digital value upon receipt of a control signal on its $\overline{RD}$ and $\overline{CS}$ pins from the CPU 38. The digital value of the signal at the time read by the analog-to-digital convertor 44 is supplied to the CPU and stored in a RAM 46 for further processing, such as to determine average peak value of the pulses.

In the presently preferred embodiment of the invention, it is desired to read the value of each pulse comprising the signal at its peak value. As noted above, each pulse corresponds to an object passing through the analysis head 16. Since the time at which the peak value of the pulse produced by either of the photodetectors 28 and 30 should be approximately the same, the signal produced by the detector 30 is selected for use and the circuitry for detecting the peak value will now be described. It is noted that while the timing of the peak of each pulse is determined using the signal from the photodetector 30, the same timing is used to provide a common control signal to both of the analog-to-digital converters 44 so as to simultaneously read the peak value of the signal of each of the photodetectors 28 and 30.

Figure 5B:
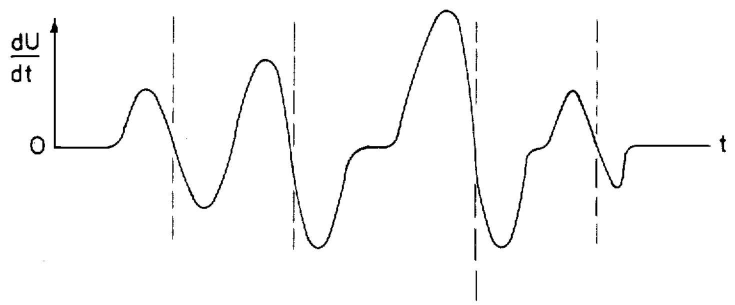
FIG. 5B shows the derivative of the signal of FIG. 5A.

To determine the time at which the peak value of a pulse is reached, the output of the operational amplifier 40 is supplied through a pair of buffers 46 and 48. The buffer 48 appears on FIG. 4B. The output of the buffer 48 is differentiated by the resistance-capacitance circuit comprising the resistor 50 and capacitor 52. The signal produced at the junction of the resistor 50 and the capacitor 52 is shown in FIG. 5B for the signal shown in FIG. 5A, and represents the derivative of the signal shown in FIG. 5A. The derivative signal is passed through the buffer 54 to the input of an amplifier 56. The output of the amplifier 56 is provided to the input of a pair of comparators 58A and 58B.

Figure 5C:
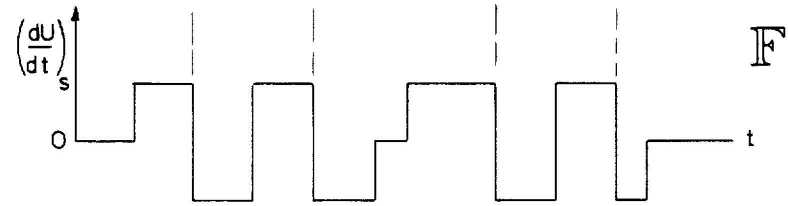
FIG. 5C shows a square wave signal obtained from the derivative of FIG. 5B.

The comparator 58A compares the derivative signal with a −100 millivolt threshold and the comparator 58B compares the derivative signal with a +100 millivolt threshold to produce the square wave shown in FIG. 5C which corresponds to the derivative signal of FIG. 5B. The square wave produced at the output of the comparators 58A and 58B are, respectively, differentiated by the resistance-capacitance circuit comprising the resistor 60A and the capacitor 62A, and by the resistance-capacitance circuit comprising the resistor 60B and the capacitor 62B.

The differentiated signal from the comparator 58B is supplied to a one-shot 64 having a pulse of 300 microseconds. The output of the one-shot 64 provides a clean pulse to an AND gate 66, which as will be described below, provides an object count pulse corresponding to each object being sorted producing a pulse from the photodetector 30 which is above a predetermined standard threshold level.

The differentiated signal from the comparator 58A triggers a one-shot having a period of 300 microseconds formed by a pair of inverters 70 and 72 and the resistance-capacitance circuit comprising the resistor 74 and the capacitor 76. The signal is provided to one input of an AND gate 68, and the output of the one-shot 64 is provided to the other input of the AND gate 68 through an inverter. Since the AND gate 68 provides a pulse on its output only if high signals are present on both of its inputs, the circuitry just described provides time-wise overlapping signals only at the zero crossing transitions of the square wave function of the derivative signal shown in FIG. 5C corresponding to the peak amplitude values of the pulses. That is, at the time the square wave makes a transition from the positive to negative, which corresponds to the zero crossing of the derivative signal shown in FIG. 5B and indicates the peaks of the signal shown in FIG. 5A. Other transitions in the square wave signal do not generate a pulse at the output of the AND gate 68. For the circuitry just described, if the pulse at the input of the AND gate 6B corresponding to the differentiated signal from the comparator 58A is inside the pulse at the input corresponding to the differentiated signal of the comparator 58B (via the one-shot 64), a single pulse is provided through an inverter 80 to one input of an AND gate 82. If the pulse at the input of the AND gate 68 corresponding to the differentiated signal from the comparator corresponding to the differentiated signal of the comparator 58B, it signifies a speck has been sensed and no output signal is provided by the AND gate 68.

The other input of the AND gate 82 is received from a one-shot through an inverter 86. The one-shot 84 is triggered by a comparator 88 which compares the amplified signal with its DC level restored, taken from the output of the operational amplifier 42A (see FIG. 4A) to a predetermined 1.5 volt level and insures proper timing of the output of the AND gate 82. The one-shot 84 is inhibited at the initialization of the apparatus 10 or if the pulse count has reached the sample count of 256. The output of the AND gate 82 provides an interrupt signal to the CPU 38 and indicated the time at which the peak value of the pulse should be read. The interrupt causes the CPU 38 to send the control signal to the analog-to-digital convertors 44 for reading the digital value of the analog signals at their peak value. As previously noted, both signals being processed from the photodetectors 28 and 30 are simultaneously read.

As previously described, it is necessary for the present invention to have a count of the objects passing through the analysis head 16. This count is achieved by a comparator 90 which compares the amplified signal with its DC level restored, taken from the output of the operational amplifier 42A to a predetermined spot threshold voltage level of 4 volts so as to limit the count to objects having a pulse with a peak amplitude value is excess of the spot threshold level. The output of the comparator 90 is provided to the one input of the AND gate 66, which as described above, has its other input connected to the output of the one-shot 64. The output of the AND gate 66 provides an object count for pulses above the threshold set for the comparator 90.

As shown in FIG. 3, the CPU 38 has, in addition to the RAM 46 operating therewith, a ROM 92 and the necessary input/output circuitry 94 for the displays and controls of the control unit 24.

Figure 8:
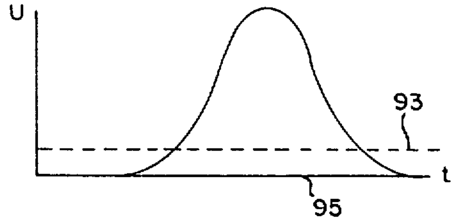
FIG. 8 shows a single pulse of a typical signal such as shown in FIG. 5A but with its DC level restored.

As previously described, it is desirable to restore the DC level of the signal from the photodetectors 28 and 30 before their analog values are read by anolog-to-digital convertors 44. In FIG. 8, a pulse is shown in which the DC zero level is shifted to the level indicated by broken line 93 due to the effects of at least one capacitor which normally is present in the signal path. By adding the absolute value of the negative part of the signal to same, a signal is obtained, the DC zero voltage level of which is restored to the original one (the solid line indicated at 95. Thus, the pulse peak amplitude value can be determined without the ambiguities of an uncertain DC level.

A circuit for obtaining this result is shown in FIG. 4 and includes the operational amplifiers 42A and 42B. The signal output of the amplifier 40 is provided to an input capacitor 96, which causes the shift indicated by broken line 93 in FIG. 8. A junction point 98 between the capacitor 96 and the buffer operational amplifier 42A is connected to the inverting input of the operational amplifier 42B through a resistor 100. The noninverting input of the amplifier 42B is grounded. Alternatively, it could be connected to a reference DC voltage. The output of the operational amplifier 42B is connected to the anode of a diode 102, and cathode of the diode is connected to the junction point 98.

Sometimes a pulse will not contain only one peak, but also additional peaks. This will be the case if spots on the object are present which are much darker or brighter than the remaining surface of the object. If these additional peaks are recorded and processed, further information about the quality of the object can be obtained. If this information is also used for sorting the objects, a product of higher quality can be obtained.

Figure 6A:
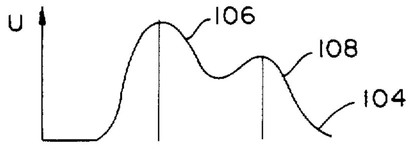
FIG. 6A shows a typical signal such as shown in FIG. 5A except that the pulse for a single object being sorted has two peak values.
Figure 6B:
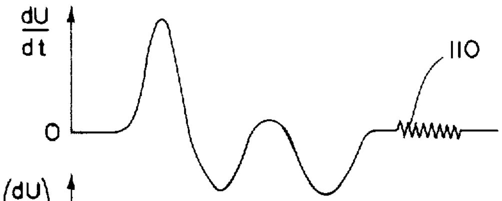
FIG. 6B shows the derivative of the signal of FIG. 6A.
Figure 6C:
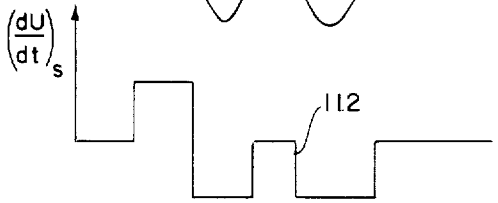
FIG. 6C shows a square wave signal obtained from the derivative of FIG. 6B.

In the presently preferred embodiment of the invention, a number of pulses is determined only from the number of main peaks of the pulses. A pulse corresponding to an object is shown in FIG. 6A as having a pair of peaks as a result of a large imperfection which produces the central depression in the pulse. The derivative signal is shown in FIG. 6B for the pulse of FIG. 6A. The square were signal resulting from the derivative signal is shown in FIG. 6C. By amplifying and evaluating the negative portions of the derivative signal of the pulse as a square wave, further information can be obtained about the secondary peaks and thus the imperfections of the object being sampled. This is due to the fact that the secondary peak can be quite flat such that the derivative is very small, although positive in this portion. Thus the derivative may be hidden within the noise. If, however, also the negative portion of the derivative signal is used, the secondary peak can also be detected.

The usefulness of this square wave from (dU/dt)s is more clearly shown in FIG. 6A, where the pulse 104 has two peaks, i.e. a main peak 106 and a secondary peak 108 which might be due to the fact that the object corresponding to the pulse has a spot on its surface. As can be seen in FIG. 6B, the very flat secondary peak produces only a very small positive portion of the derivative signal dU/dt. This small positive portion can be completely hidden in the noise which is indicated at 110. If, however, also the negative portion of the square wave form of FIG. 6C is amplified and used, the position of the secondary peak 108 can nevertheless be detected with aid of the portion 112 of the square wave form, where the signal quickly drops from zero to the maximum negative value.

Figure 7:
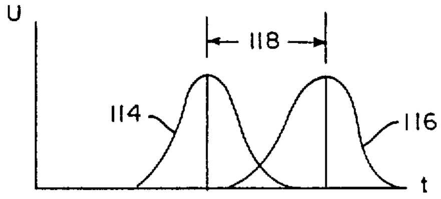
FIG. 7 shows a typical signal of two pulses for a single object being sorted, each produced by one of the rows of optical fibers shown in FIG. 9.

As mentioned above, an alternative embodiment of the analysis head 16 may be used with the present embodiment using the double rows of optical fibers 18 shown in FIG. 9. The ends of the optical fibers 18 are positioned in two rows located about the interior of the opening 14 of the head 16. The optical fibers in each of the two rows are indicated by the reference numerals 18A and 18B. The optical fibers for each row form two separate bundles for the two frequencies of light sources being used, and in much the same way described above, the peak value for the pulse produced by each of the photodetectors associated with the two rows is detected. As shown in FIG. 7, two pulses 114 and 116 are produced by a single object passing by the two rows of optical fibers, and the pulses are separated by an amount indicated by the numeral 118. The optical fibers 18A produce the pulse 114 whereas the optical fibers 18B produce the pulse 116. The time-wise difference between these pulses, which is indicated at 118, is a measure of the speed of the sample object being sorted. This time-wise difference can be accurately determined by determining the point when the respective derivative signals of the pulses go through zero, in the manner described above.

As noted above, the sorting device has to be activated within a delay which corresponds to the average flight time of the objects being sorted as they pass between the optical fibers and the deflecting means, and the flight time can be somewhat different for each object. Therefore, a certain danger exists that much faster or slower objects than the average flight time will not be sorted out properly. In order to avoid these problems, the two rows of optical fibers are separated by a known distance with respect to each other in the direction of travel of the falling objects being sorted. The resulting time-wise distance between the peaks of the corresponding pulses produced by the two rows of optical fibers is measured and used to determine the delay with which the deflecting means is activated and after the object has passed the optical fibers, to deflect rejected objects.

It will be appreciated that, although specific embodiments of the invention have been described herein for purposes of illustration, various modifications may be made without departing from the spirit and scope of the invention. Accordingly, the invention is not limited except by the appended claims.

I claim:

1. A method for automatically adjusting the variable gain of a sorting device that sorts individual samples of material using a signal processor which activates the sorting device, comprising:

producing a signal pulse for each sample and amplifying the pulse according to the gain to which the signal processor has been previously adjusted;

measuring an amplitude value of each of the amplified pulses;

generating the total count of said amplified pulses up to a predetermined count;

counting the amplified pulses within the total count having an amplitude value exceeding a predetermined standard value; and readjusting the gain of the signal processor when the number of amplified pulses having an amplitude value exceeding the predetermined standard value deviates from a preselected number.

2. The method of claim 1 wherein the gain is increased if the number of amplified pulses having an amplitude value exceeding the predetermined standard value is below the preselected number.

3. The method of claim 1 wherein the gain is decreased if the number of amplified pulses having an amplitude value exceeding the predetermined standard value is above the preselected number.

4. The method of claim 1 wherein the amplitude value of the pulses measured is the peak amplitude value.

5. The method of claim 4 wherein the peak amplitude value is determined by sampling the pulse amplitude value, storing the sampled amplitude value as the maximum amplitude value, then time-wise successively sampling the pulse amplitude value and comparing the sampled amplitude value to the stored maximum amplitude value, and if the sampled amplitude value exceeds the stored maximum amplitude value, storing the sampled amplitude value as the maximum amplitude value for the pulse, the final stored maximum amplitude value being the peak amplitude value of the pulse.

6. The method of claim 1 wherein the peak amplitude value is determined by taking the derivative of the pulse to provide a derivative signal, and measuring the amplitude value of the pulse at about the time the derivative signal has a zero crossing value.

7. The method of claim 6 further including converting the derivative signal into a square wave function, and measuring the amplitude value of the pulse at about the time the square wave has a zero crossing value.

8. The method of claim 1 further including restoring the DC level of the pulse before measuring its amplitude value.

9. The method of claim 1 wherein only amplified pulses having an amplitude above a preselected threshold limit are counted, the threshold limit being selected such that spots or imperfections of the samples will not produce pulses which are measured and counted as another sample.

10. The method of claim 1 further including producing two time-wise spaced-apart pulses for each sample, with the spacing indicating the traveling speed of the sample, and controlling the timing for activation of the sorting device based on the traveling speed of the sample.

11. A sorter for sorting individual samples of material, comprising:

detector means for providing a signal pulse for each sample, the amplitude of the pulse indicating a property of the sample;

signal processor means for receiving and amplifying the pulse, the signal processor means including gain adjustment means for selectively increasing and decreasing the amplitude of the pulse;

measurement means for measuring the amplitude of the amplified pulse and indicating the amplitude value of the amplified pulse;

comparator means for comparing the amplitude value of the amplified pulse to a predetermined standard value;

sorting means for comparing the amplitude value to a predetermined failure value and generating a failure signal if the amplitude value is below the predetermined failure value, for rejecting the sample corresponding to the failure signal;

means for counting the number of pulses having an amplitude value above the predetermined standard value out of a total count of pulses up to a predetermined count; and means for comparing the counted number of pulses having an amplitude value above the predetermined standard value to a preselected number, and when the counted number is above or below the preselected number, providing a control signal to the signal processor means for decreasing or increasing, respectively, the amplitude of the pulses to adjust toward the preselected number.

12. The sorter of claim 11 further including means for comparing the pulses to a preselected threshold limit, and wherein the counting means count only pulses above the threshold limit, the threshold limit being selected above the signal level typically created by spots or imperfections of the samples, whereby the spots and imperfections creating signal variations will not be detected and counted as if pulses of another sample.

13. The sorter of claim 11 wherein the amplitude value of the amplified pulse compared to the predetermined standard value is the peak amplitude value of the pulse.

14. The sorter of claim 13 further including means for time-wise successively sampling the pulse amplitude value;

means for storing a sampled amplitude value as the maximum amplitude value; and means for comparing each sampled amplitude value to the previously stored maximum amplitude value, and if the sampled amplitude value exceeds the stored maximum amplitude value, for having the storing means store the sampled amplitude value as the new maximum amplitude value for the pulse, whereby the final stored maximum amplitude value for each pulse being the peak amplitude value of the pulse.

15. The sorter of claim 13 further including means for taking the derivative of the pulse to provide a derivative signal and means for measuring the amplitude value of the pulse at about the time the derivative signal has a zero crossing value.

16. The sorter of claim 15 further including means for converting the derivative signal into a square wave function, and the means for measuring the amplitude value of the pulse measures at about the time the square wave has a zero crossing value.

17. The sorter of claim 11 further including means for restoring the DC level of the pulse before the measurement means measures the pulse amplitude.

18. The sorter of claim 11 further including means for providing two time-wise spaced-apart pulses for each sample, with the spacing indicating the traveling speed of the sample, and means for controlling the timing for activation of the sorting means based on the traveling speed of the sample.

19. A method for automatically adjusting the variable gain of a sorting device that sorts individual samples of material using a signal processor which activates the sorting device, comprising:

producing a signal pulse for each sample and amplifying the pulse according to the gain to which the signal processor has been previously adjusted;

measuring an amplitude value of each of the amplified pulses;

counting the total number of said amplified pulses up to a predetermined count;

averaging the amplitude value of all amplified pulses within the count; and readjusting the gain of the signal processor when the average amplitude of the amplified pulses within the count deviates from a preselected standard value.

20. A sorter for sorting individual samples of material, comprising:

detector means for providing a signal pulse for each sample, the amplitude of the pulse indicating a property of the sample;

signal processor means for receiving and amplifying the pulse, the signal processor means including gain adjustment means for selectively increasing and decreasing the amplitude of the pulse;

measurement means for measuring the amplitude of the amplified pulse and indicating the amplitude value of the amplified pulse;

sorting means for comparing the amplitude value to a predetermined failure value and generating a failure signal if the amplitude value is below the predetermined failure value, and rejecting the sample corresponding to the failure signal;

means for counting the total number of pulses up to a predetermined count;

means for providing an average of the amplitude value of all counted amplified pulses means for comprising the average amplitude value to a predetermined standard value, and if the average amplitude value is above or below the predetermined standard value, providing a control signal to the signal processor means for increasing or decreasing, respectively, the amplitude of the pulses to adjust the average amplitude value of the counted number in the next count toward the predetermined standard value.

21. The sorter of claim 20 further including means for comparing the pulses to a preselected threshold limit, and wherein the counting means counts only pulses above the threshold limit, the threshold limit being selected above the signal level typically created by spots or imperfections of the samples, whereby the spots and imperfections created signal variations will not be detected and processed as if pulses of another sample.

22. The sorter of claim 20 wherein the amplitude value of the amplified pulse averaged is the peak amplitude value of the pulse.

23. A gain control system for a sorter that sorts individual samples of material, comprising:

a detector for providing an analog signal pulse for each sample, the amplitude of the pulse indicating a property of the sample;

signal processing circuitry for receiving and amplifying the pulse, the signal processing circuitry including a multiplier responsive to a digital control signal for selectively increasing and decreasing the amplitude of the pulse;

an analog-to-digital converter for converting the analog amplitude value of the amplified pulse to a digital amplitude value; and a microprocessor for comparing the digital amplitude value of the amplified pulse to a predetermined stored standard value, for providing the digital control signal to the signal processing circuitry and for individually summing the total count of pulses up to a predetermined stored count and the number of amplified pulses having a digital amplitude value above the stored standard value from among the total count of pulses, the microprocessor comparing the number of amplified pulses having a digital amplitude value above the stored standard value to a preselected stored number, and providing the digital control signal to the signal processing circuitry when the number of amplified pulses is above or below the preselected stored number, whereby the amplification is adjusted in a manner which tends to produce a total number of amplified pulses from among the next total count of pulses equalling said preselected stored number.

* * * * *

UNITED STATES PATENT AND TRADEMARK OFFICE
CERTIFICATE OF CORRECTION

PATENT NO. : 4,718,558

DATED : January 12, 1988

INVENTOR(S) : Fernando Castaneda

It is certified that error appears in the above-identified patent and that said Letters Patent is hereby corrected as shown below:

Column 13, claim 11, line 36 should be indented so as not to appear as if the beginning of a new sub-paragraph.

Column 14, claim 20, line 62, delete the word "comprising" and substitute therefor --comparing--.

Signed and Sealed this

Seventh Day of June, 1988

*Attest:*

DONALD J. QUIGG

*Attesting Officer*

*Commissioner of Patents and Trademarks*